United States Patent
Schevciw

(10) Patent No.: US 11,729,570 B2
(45) Date of Patent: Aug. 15, 2023

(54) SPATIAL AUDIO MONAURALIZATION VIA DATA EXCHANGE

(71) Applicant: QUALCOMM Incorporated, San Diego, CA (US)

(72) Inventor: Andre Schevciw, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 17/332,798

(22) Filed: May 27, 2021

(65) Prior Publication Data

US 2022/0386054 A1    Dec. 1, 2022

(51) Int. Cl.
| | |
|---|---|
| H04S 3/00 | (2006.01) |
| G10L 19/008 | (2013.01) |
| H04R 5/033 | (2006.01) |
| H04S 7/00 | (2006.01) |
| H04R 5/04 | (2006.01) |

(52) U.S. Cl.
CPC ............ *H04S 3/004* (2013.01); *G10L 19/008* (2013.01); *H04R 5/033* (2013.01); *H04R 5/04* (2013.01); *H04S 3/008* (2013.01); *H04S 7/304* (2013.01); *H04R 2420/07* (2013.01); *H04S 2400/01* (2013.01); *H04S 2400/11* (2013.01); *H04S 2420/01* (2013.01); *H04S 2420/11* (2013.01)

(58) Field of Classification Search
CPC .......... H04S 3/004; H04S 3/008; H04S 7/304; H04S 2400/01; H04S 2400/11; H04S 2420/01; H04S 2420/11; G10L 19/008; H04R 5/033; H04R 5/04; H04R 2420/07

USPC ......................................................... 381/303
See application file for complete search history.

(56) References Cited

U.S. PATENT DOCUMENTS

| | | | |
|---|---|---|---|
| 10,200,791 B1 | 2/2019 | Liu et al. | |
| 2012/0058727 A1 | 3/2012 | Cook et al. | |
| 2017/0192743 A1 | 7/2017 | Chun et al. | |
| 2019/0174232 A1* | 6/2019 | Tong | H04W 4/80 |

FOREIGN PATENT DOCUMENTS

EP    2942980 A1    11/2015

OTHER PUBLICATIONS

ETSI TS 126 118, "5G; 3GPP Virtual reality profiles for streaming applications," 3GPP TS 26.118, version 15.0.0, Release 15, Oct. 2018, pp. 1-68.

Nachbar C., et al., "Ambix—A Suggested Ambisonics Format," Ambisonics Symposium 2011, Jun. 3, 2011 (Jun. 3, 2011), pp. 1-11. XP055137979, Lexington. KY Retrieved from the Internet: URL: http://iaem.at/Members/zotter/publications/2011_NachbarZotterSontacchiDeleflie_ambix.pdf.

(Continued)

*Primary Examiner* — Paul Kim
(74) *Attorney, Agent, or Firm* — Moore IP

(57) ABSTRACT

A device includes a memory configure to store instructions and one or more processors configured to execute the instructions to obtain spatial audio data at a first audio output device. The one or more processors are further configured to perform data exchange, between the first audio output device and a second audio output device, of exchange data based on the spatial audio data. The one or more processors are also configured to generate first monaural audio output at the first audio output device based on the spatial audio data.

30 Claims, 7 Drawing Sheets

(56) References Cited

OTHER PUBLICATIONS

International Search Report and Written Opinion—PCT/US2022/072569—ISA/EPO—dated Sep. 12, 2022.
F. Adriaensen, "AmbDec 0.4.2 User Manual," modified: Oct. 5, 2009, 2011, accessed online Nov. 22, 2022: http://kokkinizita.linuxaudio.org/linuxaudio/downloads/ambdec-manual.pdf.

* cited by examiner

SPATIAL AUDIO MONAURALIZATION VIA DATA EXCHANGE

I. FIELD

The present disclosure is generally related to using data exchange to facilitate generation of monaural audio output based on spatial audio data.

II. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

The proliferation of such devices has facilitated changes in media consumption. For example, there has been an increase in personal electronic gaming, where a handheld or portable electronic game system is used by a single person to play an electronic game. As another example, there has been an increase in personal media consumption, where a handheld or portable media player outputs media (e.g., audio, video, augmented reality media, virtual reality media, etc.) to a single person. Such personalized or individualized media consumption often involves relatively small, portable (e.g., battery-powered) devices for generating output. The processing resources available to such portable devices may be limited due to the size of the portable device, weight constraints, power constraints, or for other reasons. As a result, it can be challenging to provide a high quality user experience using these resource constrained devices.

III. SUMMARY

According to a particular aspect of the present disclosure, a device includes a memory configured to store instructions and one or more processors configured to execute the instructions to obtain spatial audio data at a first audio output device. The one or more processors are further configured to perform data exchange, between the first audio output device and a second audio output device, of exchange data based on the spatial audio data. The one or more processors are also configured to generate first monaural audio output at the first audio output device based on the spatial audio data.

According to a particular aspect of the present disclosure, a method includes obtaining, at a first audio output device, spatial audio data. The method also includes performing data exchange, between the first audio output device and a second audio output device, of exchange data based on the spatial audio data. The method further includes generating first monaural audio output at the first audio output device based on the spatial audio data.

According to another implementation of the present disclosure, a non-transitory computer-readable medium stores instructions that, when executed by one or more processors, cause the one or more processors to obtain spatial audio data at a first audio output device. The instructions, when executed, also cause the one or more processors to perform data exchange, between the first audio output device and a second audio output device, of exchange data based on the spatial audio data. The instructions, when executed, further cause the one or more processors to generate first monaural audio output at the first audio output device based on the spatial audio data.

According to another implementation of the present disclosure, an apparatus includes means for obtaining spatial audio data at a first audio output device. The apparatus also includes means for performing data exchange, between the first audio output device and a second audio output device, of exchange data based on the spatial audio data. The apparatus further includes means for generating first monaural audio output at the first audio output device based on the spatial audio data.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Audio information can be captured or generated in a manner that enables rendering of audio output to represent a three-dimensional (3D) sound field. For example, ambisonics (e.g., first-order ambisonics (FOA) or higher-order ambisonics (HOA)) can be used to represent a 3D sound field for later playback. During playback, the 3D sound field can be reconstructed in a manner that enables a listener to distinguish the position and/or distance between the listener and one or more audio sources of the 3D sound field.

According to a particular aspect of the disclosure, a 3D sound field can be rendered using a personal audio device, such as a headset, headphones, ear buds, or another audio playback device that is configured to generate distinct audio output for each ear of a user (e.g., two monaural audio output streams). One challenge of rendering 3D audio using a personal audio device is the computational complexity of such rendering. To illustrate, a personal audio device is often configured to be worn by the user, such that motion of the user's head changes the relative positions of the user's ears and the audio source(s) in the 3D sound field to generate head-tracked immersive audio. Such personal audio devices are often battery powered and have limited onboard computing resources. Generating head-tracked immersive audio with such resource constraints is challenging. One way to sidestep certain power- and processing-constraints of personal audio devices is to perform much of the processing at a host device, such as a laptop computer or a mobile computing device. However, the more processing that is performed on the host device, the greater the latency between head motion and sound output, which leads to less satisfactory user experience.

Additionally, many personal audio devices include a pair of distinct audio output devices, such as a pair of ear buds that includes one ear bud for each ear. In such configurations, it is useful to balance power demands imposed on each audio output device so that one audio output device does not run out of power before the other. Since simulating a 3D sound field requires providing sound to both ears of a user, failure of one of the audio output devices (e.g., due to running out of battery power) would prematurely cease generation of 3D audio output.

Aspects disclosed herein facilitate reduction of computational complexity for generation of head-tracked immersive audio by using a simplified 3D sound field communication scheme to reduce the number of convolution operations performed onboard the personal audio device, exchanging data between audio output devices to reduce the number of stereo decoding operations performed onboard the personal audio device, and generating monaural audio output. Aspects disclosed herein also facilitate balancing resource demands between a pair of audio output devices to extend the duration of 3D sound field reproduction that can be provided by the audio output devices.

Figure 1:
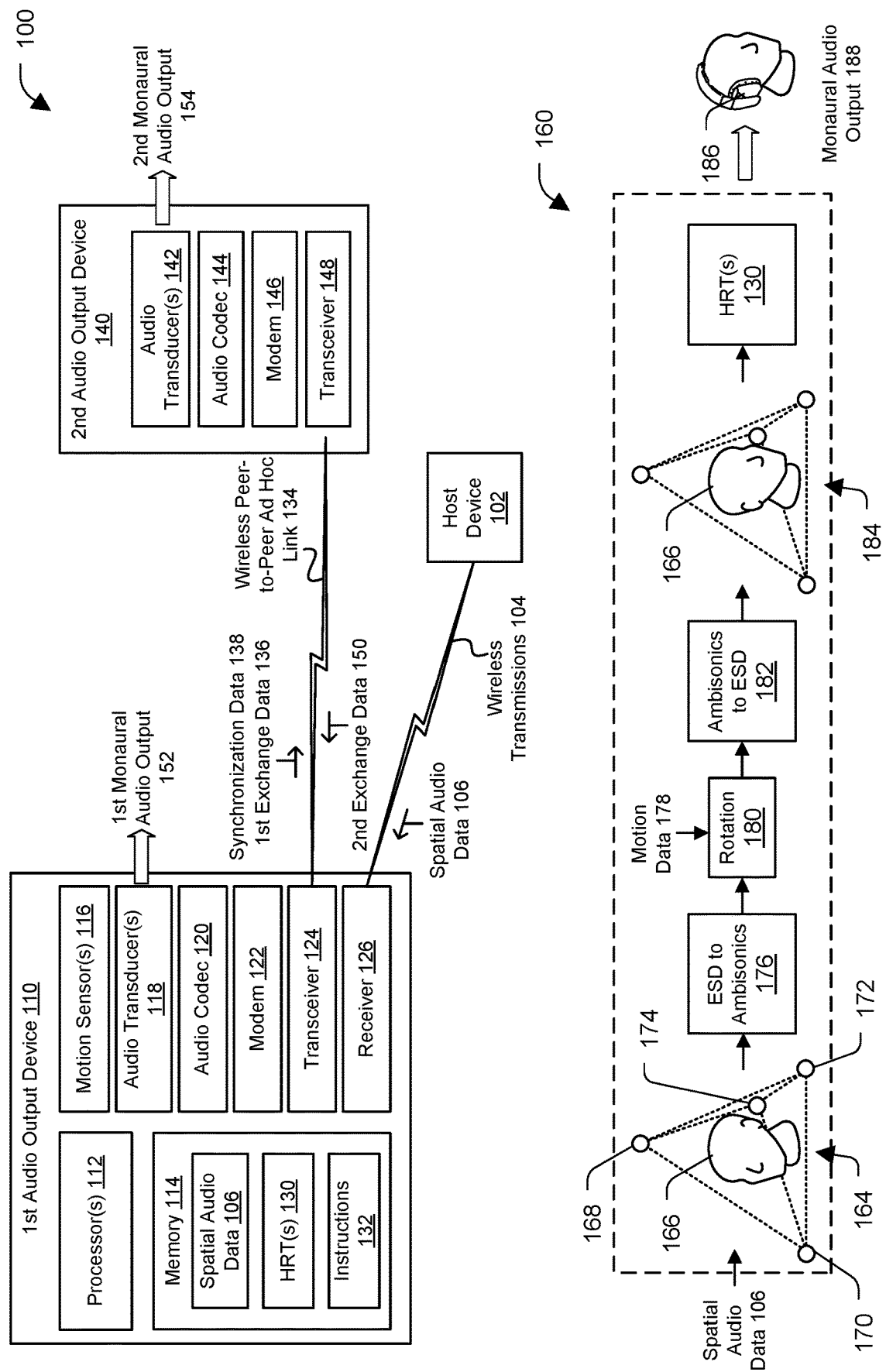
FIG. 1 is a block diagram of a particular illustrative aspect of a system that includes multiple audio output devices configured to exchange data to enable generation of monaural audio output from spatial audio data, in accordance with some examples of the present disclosure.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. Further, some features described herein are singular in some implementations and plural in other implementations. To illustrate, FIG. 1 depicts a first audio output device 110 including one or more processors ("processor(s)" 112 of FIG. 1), which indicates that in some implementations the first audio output device 110 includes a single processor 112 and in other implementations the first audio output device 110 includes multiple processors 112.

As used herein, the terms "comprise," "comprises," and "comprising" may be used interchangeably with "include," "includes," or "including." Additionally, the term "wherein" may be used interchangeably with "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive signals (e.g., digital signals or analog signals) directly or indirectly, via one or more wires, buses, networks, etc. As used herein, "directly coupled" may include two devices that are coupled (e.g., communicatively coupled, electrically coupled, or physically coupled) without intervening components.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

Referring to FIG. 1, a particular illustrative aspect of a system 100 that includes two or more audio output devices, such as a first audio output device 110 and a second audio output device 140, that are configured to perform data exchange to generate monaural audio output based on spatial audio data 106. In the particular implementation illustrated in FIG. 1, the spatial audio data 106 is received from a host device 102 or accessed from a memory 114 of one of the audio output devices 110, 140.

The spatial audio data 106 represents sound from one or more sources (which may include real or virtual sources) in three-dimensions (3D) such that audio output representing the spatial audio data 106 can simulate distance and direction between a listener and the one or more sources. The spatial audio data 106 can be encoded using various encoding schemes, such as first order ambisonics (FOA), higher order ambisonics (HOA), or an equivalent spatial domain (ESD) representation (as described further below). As an example, FOA coefficients or ESD data representing the spatial audio data 106 can be encoded using four total channels, such as two stereo channels.

Each of the audio output devices 110, 140 is configured to generate monaural audio output based on the spatial audio data 106. In a particular example, the first audio output device 110 is configured to generate first monaural audio output 152 for a first ear of a user, and the second audio output device 140 is configured to generate second monaural audio output 154 for a second ear of the user. In this example, the first monaural audio output 152 and the second monaural audio output 154 together simulate the spatial relationship of sound source(s) relative to the ears of the user such that the user perceives the monaural audio output as spatial audio.

A diagram 160 in FIG. 1 illustrates conversion of the spatial audio data 106 to monaural audio output 188, which corresponds to or includes one or more of first monaural audio output 152 and/or second monaural audio output 154. In some implementations, each of the audio output devices 110, 140 performs one or more of the operations illustrated in the diagram 160. In other implementations, one of the audio output devices 110, 140 performs one or more of the operations illustrated in the diagram 160 and shares results of the one or more of the operations with the other of the audio output devices 110, 140 as exchange data, as described further below.

In the diagram 160, the spatial audio data 106 is in an ESD representation 164 when received. In the ESD representation 164, the spatial audio data 106 includes four channels representing virtual loudspeakers 168, 170, 172, 174 disposed around a user 166. For example, the ESD representation 164 of the spatial audio data may be encoded as first audio data corresponding to a first plurality of virtual loudspeakers or other sound sources of a 3D sound field and second audio data corresponding to a second plurality of virtual loudspeakers or other sound sources of the 3D sound field, where the first plurality of sound sources is distinct from the second plurality of sound sources. To illustrate, in the diagram 160, sound corresponding to the loudspeakers 168 and 170 may be encoded in the first audio data (e.g., as a first stereo channel), and sound corresponding to the loudspeakers 172 and 174 may be encoded in the second audio data (e.g., as a second stereo channel). By controlling the amplitude, frequency, and/or phase of sound assigned to each of the virtual loudspeakers 168, 170, 172, 174, the ESD representation 164 is able to simulate sound from one or more virtual sound sources at various distances from the user 166 and in various directions relative to the user 166.

In the example illustrated in the diagram 160, the ESD representation 164 is converted, at block 176, to an ambisonics representation (e.g., ambisonics coefficients) of the spatial audio data 106. For example, the block 176 may receive a set of audio input signals of the ESD representation 164 and converts them into a set of audio output signals in an ambisonics domain (such as an FOA or HOA domain). In some implementations, the ambisonics data is in an Ambisonics Channel Number (ACN) or Semi-normalized 3D (SN3D) data format. The audio input signals of the ESD representation 164 correspond to the spatial audio data 106 (e.g., immersive audio content) rendered at a set of predetermined virtual loudspeaker locations. In the ESD domain of the ESD representation 164, virtual loudspeakers may be located at different positions around a sphere (such as Fliege points) to preserve the ambisonics rendering energy per area on the sphere or volume within the sphere.

In a particular implementation, the operations of block 176 may be performed using an ambisonics decoder module, such as the "AmbiX Decoder" available from https://github.com/kronihias/ambix with the conversion matrices to account for the ESD representation 164.

In this example, the ambisonics representation of the spatial audio data 106 is used to perform rotation operations 180 based on motion data 178 from one or more motion sensors (e.g., motion sensor(s) 116 of the first audio output device 110). In a particular implementation, the sound field rotation is performed using techniques described by https://ambisonics.iem.at/xchange/fileformat/docs/spherical-harmonics-rotation. To illustrate, the sound field rotation operations 180 may be performed using a sound field rotator module, such as the AmbiX Soundfield Rotator" plugin available from https://github.com/kronihias/ambix. The rotation operations 180 account for changes in the relative position of the user 166 and the virtual loudspeakers 168, 170, 172, 174 due to movement indicated by the motion data 178.

Continuing the example above, the rotated ambisonics representation of the spatial audio data 106 is converted, at block 182, back to an ESD domain as a rotated ESD representation 184. In a particular implementations, the ESD domain of the ESD representation 184 is different from the ESD domain of the ESD representation 164. To illustrate, the which includes the virtual loudspeakers of the ESD domain of the ESD representation 184 may be located at different positions around a sphere that the virtual loudspeakers of the ESD domain of the ESD representation 164.

In a particular aspect, the block 182 receives $(N+1)^2$ signals of the ambisonics representation, where N is an integer representing the order of the ambisonics (e.g., N=1 for first order ambisonics, N=2 for second order ambisonics, etc.). In this particular aspect, the block 182 outputs $(N+1)^2$ signals of the ESD representation, where each signal corresponds to a virtual loudspeaker in the ESD domain. When the arrangement of the virtual loudspeaker is selected appropriately (e.g., based on a t-design grid of points on a sphere), the following property holds: H*E=I, where I is an $(N+1)^2 \times (N+1)^2$ identity matrix, H is a matrix that represents the pressure signals into the ambisonics domain, and E is an ESD transformation matrix to convert the ambisonics signals to the virtual loudspeakers of the ESD domain. In this particular aspect, the conversion between the ambisonics domain and the ESD domain is lossless.

In the example illustrated in the diagram 160, one or more head-related transfer (HRT) function(s) 130 are applied to the rotated ESD representation 184 to generate the monaural audio output 188. Application of the HRT function(s) 130 determines sound levels, frequencies, phases, other audio information, or a combination of one or more of these, to generate the monaural audio output 188 provided to one audio output device (e.g., an audio output device providing audio output to one ear of the user 166) to simulate perception of the one or more virtual sound sources at various distances from the user 166 and in various directions relative to the user 166.

Although the diagram 160 of FIG. 1 illustrates the spatial audio data 106 being received in the ESD representation 164, converted to the ambisonics representation for rotation, then converted to the rotated ESD representation 184, in other examples, the spatial audio data 106 is received in the ambisonics representation, and the conversion operation of block 176 is omitted. In still other examples, the rotation operations 180 are performed using the ESD representation 164, and the conversion operations of blocks 176 and 182 are omitted.

Figure 5:
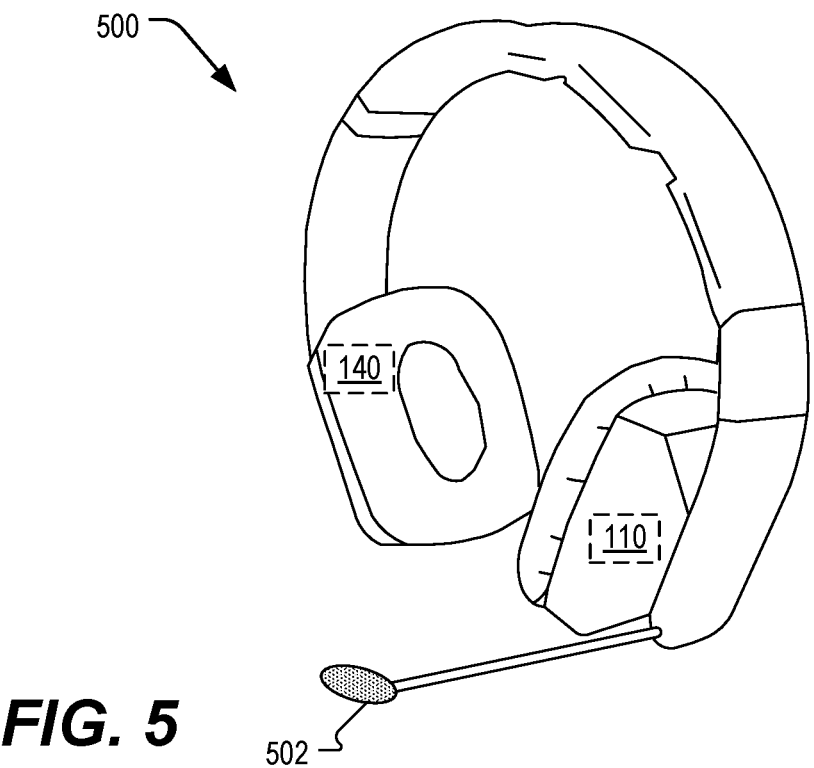
FIG. 5 is a diagram of a headset, such as headphones, operable to perform data exchange to enable generation of monaural audio output from spatial audio data, in accordance with some examples of the present disclosure.
Figure 6:
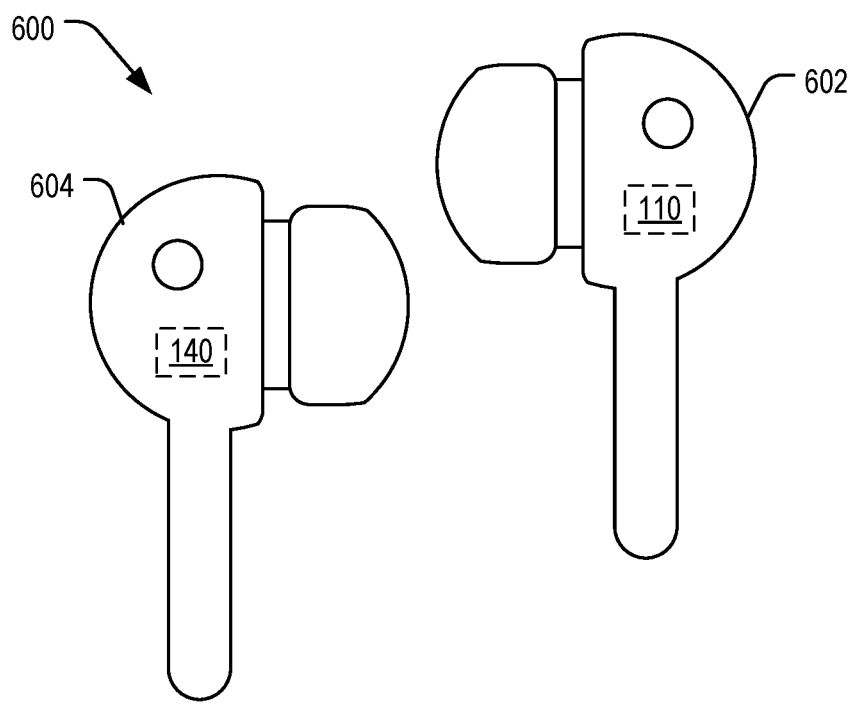
FIG. 6 is a diagram of ear buds, operable to perform data exchange to enable generation of monaural audio output from spatial audio data, in accordance with some examples of the present disclosure.
Figure 7:
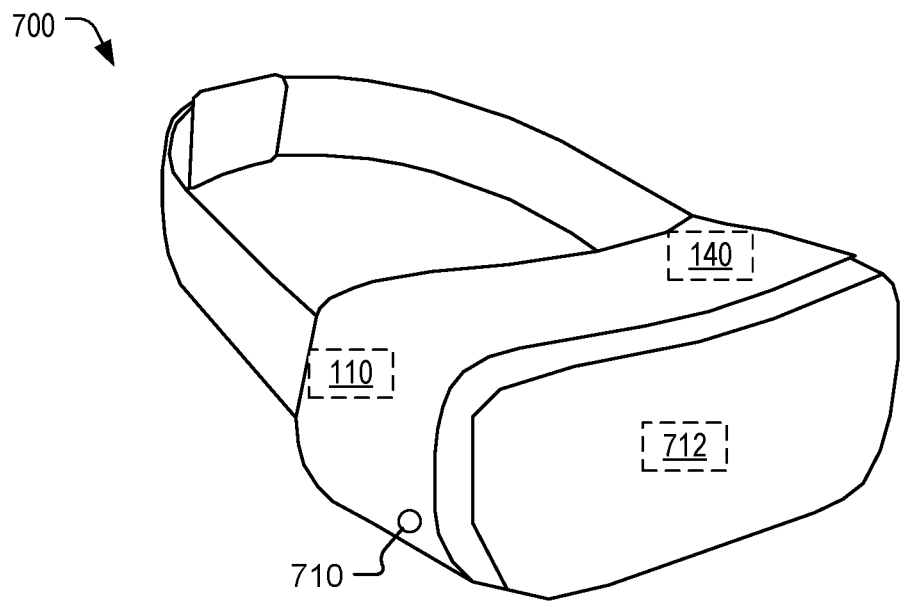
FIG. 7 is a diagram of a headset, such as a virtual reality or augmented reality headset, operable to perform data exchange to enable generation of monaural audio output from spatial audio data, in accordance with some examples of the present disclosure.

In a particular aspect, each of the audio output devices 110, 140 is configured to perform at least a subset of the operations illustrated in the diagram 160 such that a pair of monaural audio outputs (e.g., the first monaural audio output 152 and the second monaural audio output 154) is generated during operation to simulate an entire 3D sound field. In a particular example, a personal audio device includes the audio output devices 110, 140 that generate separate sound output for each of a user's ears, such as headphones (one example of which is illustrated in FIG. 5), ear buds (one example of which is illustrated in FIG. 6), or a multimedia headset (one example of which is illustrated in FIG. 7).

In FIG. 1, the first audio output device 110 includes one or more processors 112, the memory 114, a receiver 126, and a transceiver 124. The processor(s) 112 are configured to execute instructions 132 from the memory 114 to perform one or more of the operations illustrated by the diagram 160. In the example illustrated in FIG. 1, the receiver 126 and the transceiver 124 are separate components of the first audio output device 110; however, in other implementations, the transceiver 124 includes the receiver 126 or the receiver 126 and the transceiver 124 are combined in a radio chipset. In FIG. 1, the first audio output device 110 also includes a modem 122 coupled to the one or more processors and to the receiver 126, the transceiver 124, or both. The first audio output device 110 also includes an audio codec 120 coupled to the modem 122, to the one or more processors 112, or to both, and coupled to one or more audio transducers 118. In FIG. 1, the first audio output device 110 includes one or more motion sensors 116 coupled to the processor(s) 112.

In the example illustrated in FIG. 1, the second audio output device 140 includes a transceiver 148, a modem 146, an audio codec 144, and one or more audio transducers 142. In other examples, the second audio output device 140 also includes one or more processors, a memory, one or more motion sensors, other components, or a combination thereof. To illustrate, in some implementations, the second audio output device 140 includes the same features and components as the first audio output device 110.

In a particular implementation, the receiver 126 is configured to receive wireless transmissions 104 from the host device 102, and the transceiver 124 is configured to support data exchange with the second audio output device 140. For example, the transceiver 124 of the first audio output device 110 and the transceiver 148 of the second audio output device 140 may be configured to establish a wireless peer-to-peer ad hoc link 134 to support data exchange. The wireless peer-to-peer ad hoc link 134 may include a connection that conforms to a BLUETOOTH® protocol specification (BLUETOOTH is a registered trademark of BLUETOOTH SIG, INC. of Kirkland, Wash., USA), a connection that conforms to an IEEE® protocol specification (IEEE is a registered trademark of The Institute of Electrical and Electronics Engineers, Inc. Piscataway N.J., USA), a connection that conforms to a proprietary protocol, or another wireless peer-to-peer ad hoc connection. The wireless peer-to-peer ad hoc link 134 between the first and second audio output devices 110 and 140 may use the same protocols as the wireless transmissions 104 from the host device 102 or may use one or more different protocols. To illustrate, the host device 102 may send the spatial audio data 106 via a BLUETOOTH connection, and the first and second audio output devices 110 and 140 may exchange data via a proprietary connection.

During operation, the first audio output device 110 obtains the spatial audio data 106 by reading the spatial audio data 106 from the memory 114 or via the wireless transmissions 104 from the host device 102. In a particular aspect, the first audio output device 110 and the second audio output device 140 each receive a portion of, or all of, the spatial audio data 106 from the host device 102, and the audio output devices 110, 140 exchange data to generate their respective monaural audio output 152, 154.

Figure 2:
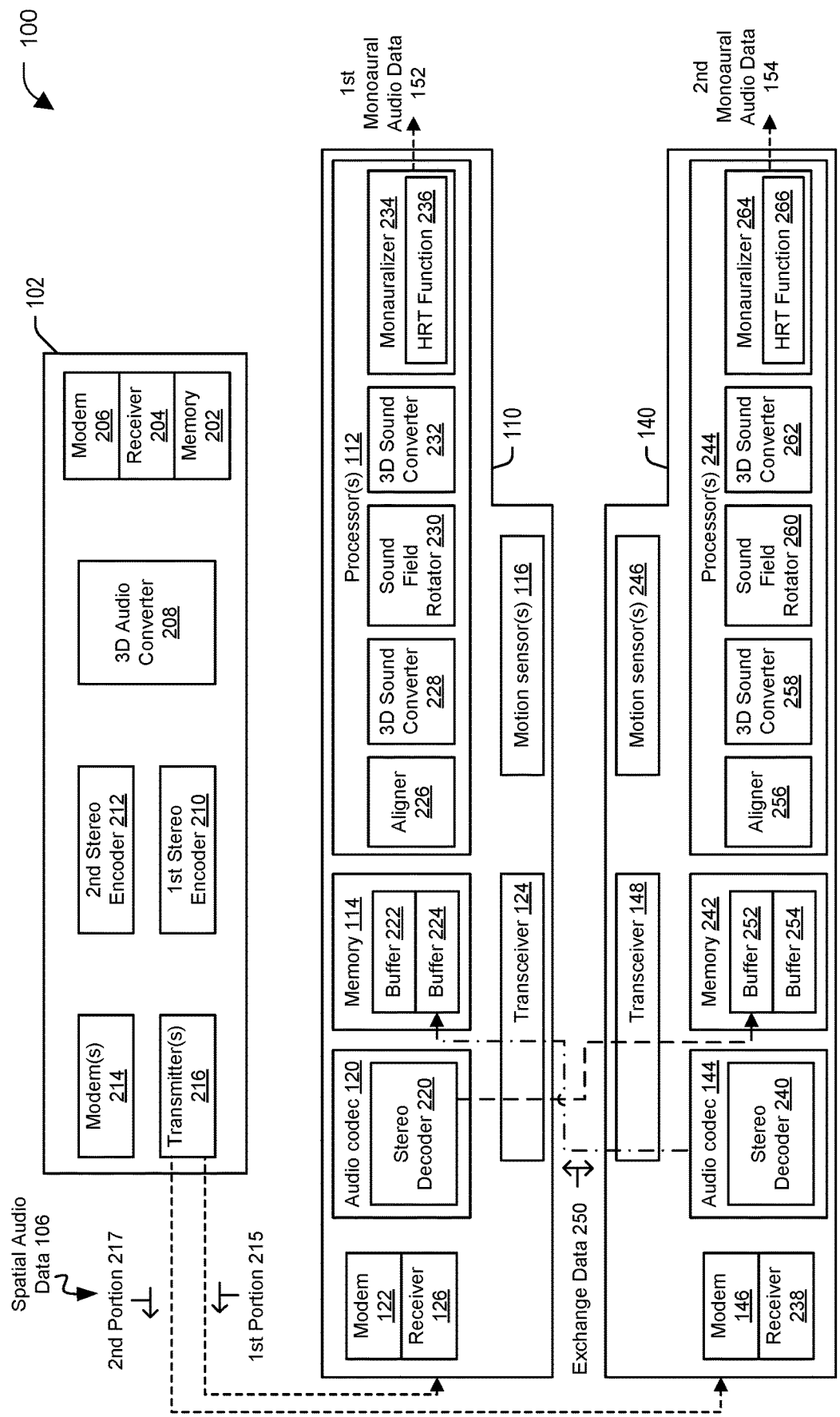
FIG. 2 is a block diagram of a particular illustrative example of the system of FIG. 1, in accordance with some examples of the present disclosure.
Figure 3:
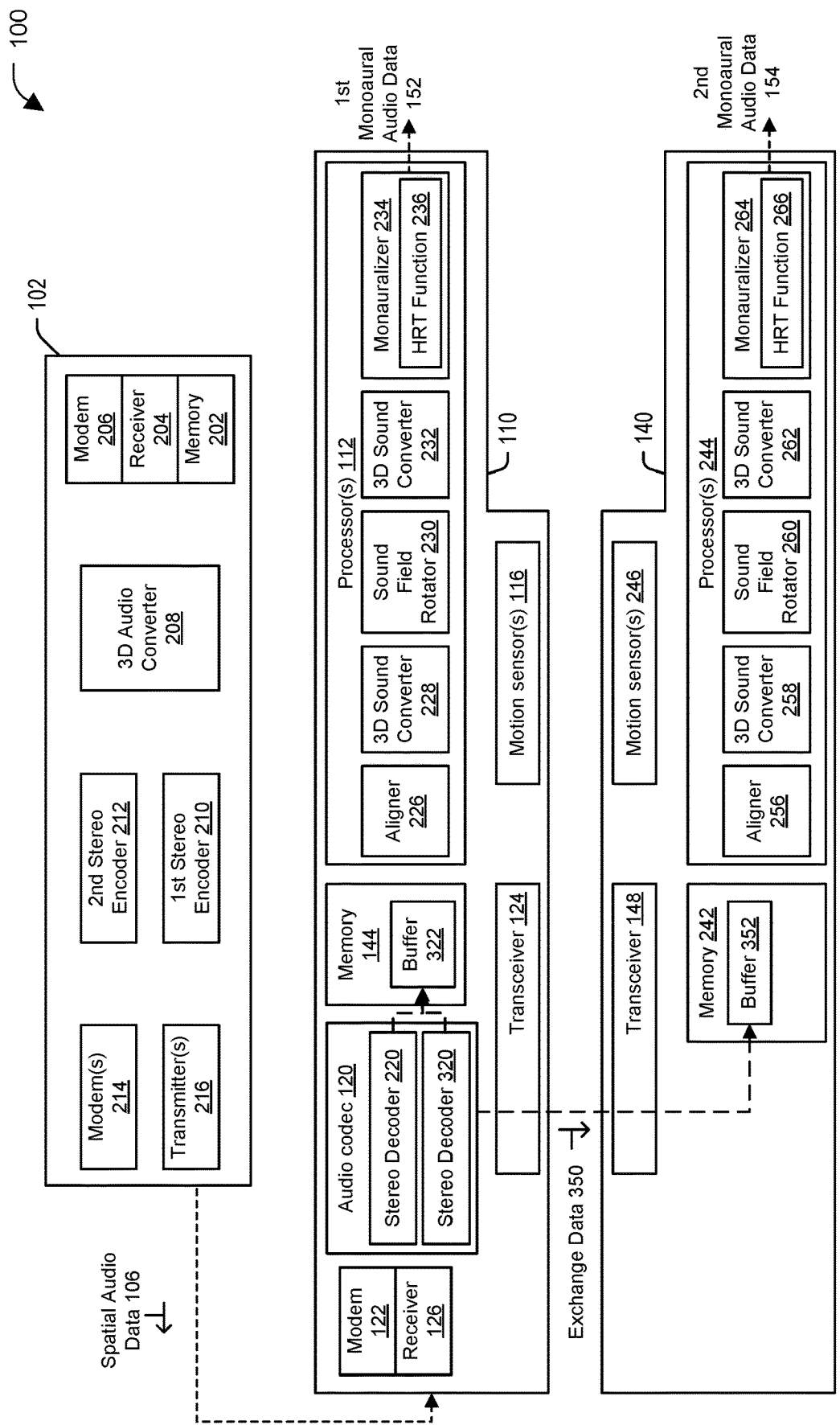
FIG. 3 is a block diagram of another particular illustrative example of the system of FIG. 1, in accordance with some examples of the present disclosure.
Figure 4:
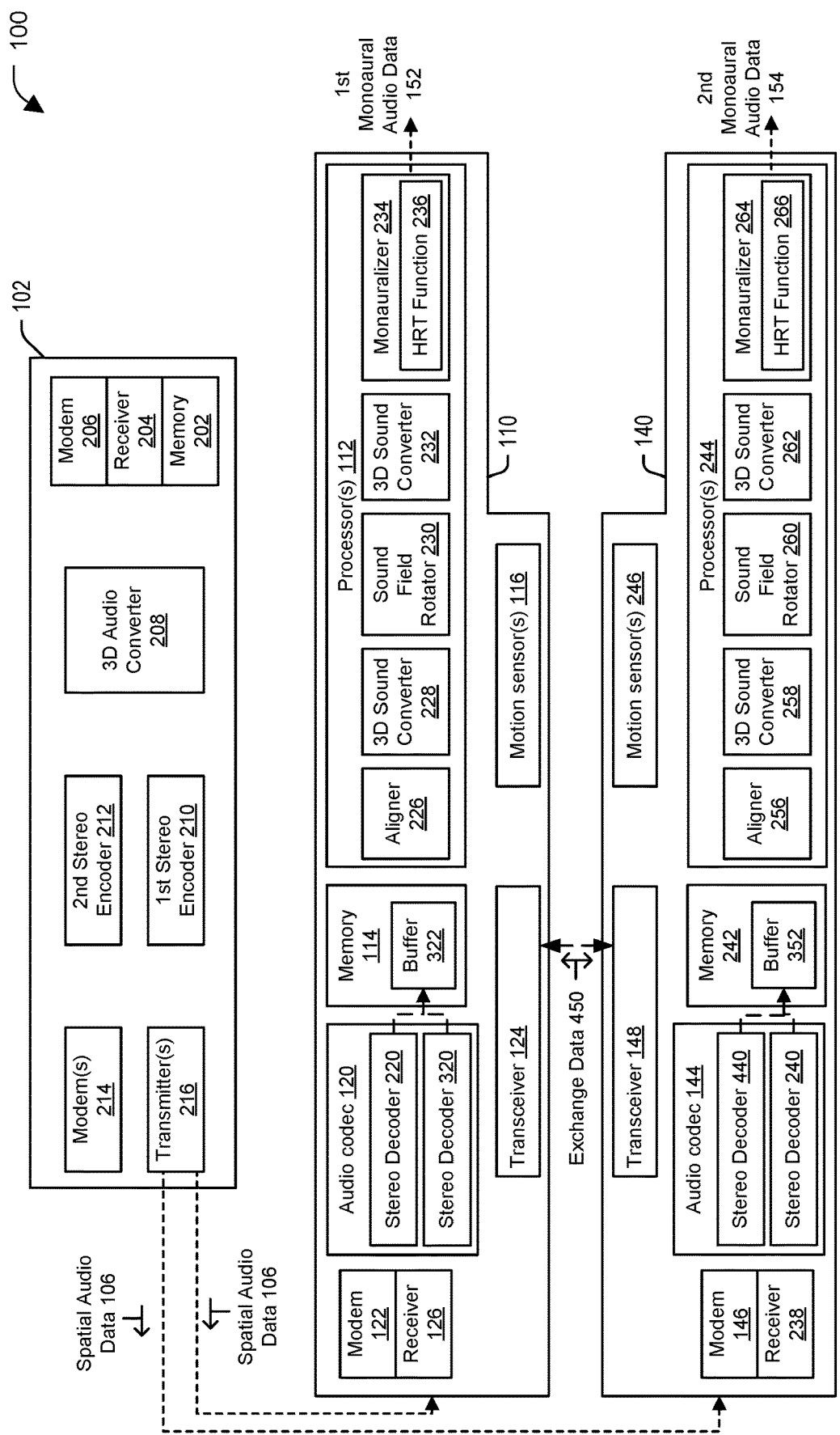
FIG. 4 is a block diagram of another particular illustrative example of the system of FIG. 1, in accordance with some examples of the present disclosure.

In some implementations, the spatial audio data 106 includes four channels of audio data, encoded as two stereo channels, corresponding to the ESD representation 164 of the spatial audio data 106. In some such implementations, two channels of the four channels are encoded (e.g., as a first stereo channel) and transmitted to the first audio output device 110, and the other two channels of the four channels are encoded (e.g., as a second stereo channel) and transmitted to the second audio output device 140. FIG. 2 illustrates an example of such an implementation, as described further below. In other implementations, the spatial audio data 106 is encoded as two stereo channels or as ambisonics coefficients and transmitted to only one of the audio output devices 110, 140, such as to the first audio output device 110. FIG. 3 illustrates an example of such an implementation. In still other implementations, the spatial audio data 106 is encoded as two stereo channels or as ambisonics coefficients and transmitted to both of the audio output devices 110, 140. FIG. 4 illustrates an example of such an implementation.

In an implementation (such as the example of FIG. 2) in which a first portion of the spatial audio data 106 is transmitted to the first audio output devices 110 and a second portion of the spatial audio data 106 is transmitted to the second audio output devices 140, the first audio output device 110 decodes the first portion of the spatial audio data 106 and sends first exchange data 136 to the second audio output device 140. In this implementation, the first exchange data 136 may include data representing the decoded first portion of the spatial audio data 106, such as ambisonics coefficients corresponding to the first portion of the spatial audio data, audio waveform data (e.g., pulse-code modulation (PCM) data), and/or other data representing the decoded first portion of the spatial audio data 106. Likewise, in this implementation, the second audio output device 140 decodes the second portion of the spatial audio data 106 and sends second exchange data 150 to the first audio output device 110. The data exchange may also include synchronization data 138 (generated by one or both of the audio output devices 110, 140) to facilitate synchronization of playback by the audio output devices 110, 140. In this implementation, after the data exchange, each of the audio output devices 110, 140 has both the first portion of and the second portion of the spatial audio data 106. In some exemplary implementations, each of the audio output devices may assemble the first and second portions of the spatial audio data 106 for monaural audio output.

In an implementation (such as the example of FIG. 3) in which the spatial audio data 106 is transmitted to only the first audio output device 110, the first audio output device 110 decodes the spatial audio data 106 and sends the first exchange data 136 to the second audio output device 140. In this implementation, the first exchange data 136 includes data representing the decoded spatial audio data 106, such as ambisonics coefficients corresponding to the spatial audio data, audio waveform data (e.g., pulse-code modulation (PCM) data), and/or other data representing the decoded spatial audio data 106. The first audio output device 110 may send the decoded spatial audio data 106 to the second audio output device 140 before performing the operations described with reference to the diagram 160, or after any of the operations described with reference to the diagram 160. To illustrate, the first exchange data 136 may include the ESD representation 164 of the spatial audio data 106, the ambisonics coefficients output by block 176, the rotated ambisonics coefficients generated by the rotation operations 180 based on the motion data 178, or the rotated ESD representation 184.

The data exchange may also include the synchronization data 138 to facilitate synchronization of playback by the audio output devices 110, 140. In this implementation, after the data exchange, each of the audio output devices 110, 140 has the full content of the spatial audio data 106.

In an implementation (such as the example of FIG. 4) in which the spatial audio data 106 is transmitted to both the first audio output device 110 and the second audio output devices 140, each of the audio output devices 110, 140 decodes the spatial audio data 106 and one or both of the audio output devices 110, 140 sends exchange data 136, 150 to the other audio output devices 110, 140. In this implementation, the exchange data 136, 150 includes or corresponds to the synchronization data 138 to facilitate synchronization of playback by the audio output devices 110, 140. In this implementation, each of the audio output devices 110, 140 has the full content of the spatial audio data 106 before the data exchange, and the data exchange is used to synchronize playback.

In some implementations, each of the audio output devices 110, 140 includes one or more motion sensors, such as the motion sensor(s) 116. In such implementations, each of the audio output devices 110, 140 performs the rotation operations 180 based on motion data 178 from the respective motion sensors. In other implementations, only one of the audio output devices 110, 140 includes motion sensor(s), and the exchange data include the motion data 178, or the exchange data sent from one audio output device to the other (e.g., from the first audio output device 110 to the second audio output device 140) includes the rotated ESD representation 184 of the spatial audio data 106, rotated ambisonics coefficients, or other data representing a rotated 3D sound field.

In various implementations, the audio output devices 110, 140 have more or fewer components than illustrated in FIG. 1. In a particular implementation, the processor(s) 112 include one or more central processing units (CPU), one or more digital signal processor (DSPs), one or more other single-core or multi-core processing devices, or a combination thereof (e.g., a CPU and a DSP). The processor(s) 112 may include a speech and music coder-decoder (CODEC) that includes a voice coder ("vocoder") encoder, a vocoder decoder, or a combination thereof.

In a particular implementation, portions of the first audio output device 110, portions of the second audio output device 140, or both, may be included in a system-in-package or system-on-chip device. In a particular implementation, the memory 114, the processor(s) 112, the audio codec 120, the modem 122, the transceiver 124, the receiver 126, the motion sensor(s) 116, or a subset or combination thereof are included in a system-in-package or system-on-chip device.

In a particular aspect, the system 100 facilitates generation of head-tracked immersive audio (e.g., the first and second monaural audio output 152, 154) by using a simplified 3D sound field communication scheme (e.g., the ESD representation 164) to reduce the number of convolution operations performed onboard the first and second audio output devices 110, 140, by exchanging data between first and second audio output devices 110, 140 to reduce the number of stereo decoding operations performed to generate the first and second monaural audio output 152, 154, by generating monaural audio output (e.g., the first and second monaural audio output 152, 154), or by a combination thereof. In a particular aspect, the system 100 facilitates balancing of resource demands between a pair of audio output devices (e.g., the first and second audio output devices 110, 140) to extend the duration of 3D sound field reproduction that can be provided by the audio output devices.

FIGS. 2, 3 and 4 are block diagrams of particular illustrative examples of the system 100 of FIG. 1, in accordance with some aspects of the present disclosure. Each of FIGS. 2, 3 and 4 illustrates additional aspects of the host device 102, the first audio output device 110, and the second audio output device 140 of FIG. 1. FIG. 2 illustrates an example in which a first portion of the spatial audio data 106 is transmitted by the host device 102 to the first audio output devices 110 and a second portion of the spatial audio data 106 is transmitted to the second audio output devices 140. FIG. 3 illustrates an example in which the spatial audio data 106 is transmitted by the host device 102 to only the first audio output device 110. FIG. 4 illustrates an example in which the spatial audio data 106 is transmitted by the host device 102 to both the first audio output device 110 and the second audio output device 140. Although FIGS. 2-4 illustrate different hardware configurations of the host device 102 and/or one or more of the audio output devices 110, 140, in some implementations, FIGS. 2-4 represent different operating modes of the same hardware. For example, each of the audio output devices 110, 140 may include two stereo decoders, as illustrated in FIG. 4; however, when the host device 102 or the audio output devices 110, 140 are operating in a particular operating mode corresponding to FIG. 2, each audio output device 110, 140 only uses one of its stereo decoders.

In the example illustrated in each of FIGS. 2-4, the host device 102 includes a receiver 204 and a modem 206 to receive and decode media that includes or represents the spatial audio data 106. The media, in one specific example, includes a game that generates audio output corresponding to the spatial audio data 106. In another specific example, the media includes virtual reality and/or augmented reality media that generates audio output corresponding to the spatial audio data 106. In still other examples, the media includes and/or corresponds to audio, video (e.g., 2D or 3D video), mixed reality media, other media content, or a combination of one or more of these. The host device 102 also includes a memory 202 to store the downloaded media for subsequent processing.

In FIGS. 2-4, the host device 102 includes a 3D audio converter 208. The 3D audio converter 208 is configured to generate data representing a 3D sound field based on the media. For example, the 3D sound field may be represented using an ESD representation, as described with reference to FIG. 1. Using an ESD representation enables encoding the 3D sound field in four channels, one per virtual loudspeaker, which conveniently enables communication of the entire 3D sound field using two stereo audio channels.

In FIGS. 2-4, the host device 102 includes a pair of stereo encoders, including a first stereo encoder 210 and a second stereo encoder 212. In a particular aspect, the first stereo encoder 210 is configured to encode a first portion 215 of the spatial audio data 106, and the second stereo encoder 212 is configured to encode a second portion 217 of the spatial audio data 106. In an example in which the 3D audio converter 208 generates data representing the 3D sound field using the ESD representation 164 of FIG. 1, the first portion 215 represents stereo audio (e.g., differential audio) for a first pair of the virtual loudspeakers (e.g., virtual loudspeakers 168 and 170), and the second portion 217 represents stereo audio for a second pair of the virtual loudspeakers (e.g., virtual loudspeakers 172 and 174).

In FIGS. 2-4, the host device 102 includes one or more modems 214 and one or more transmitters 216 coupled to the stereo encoders 210, 212 and configured to encode and transmit the first and second portions 215, 217 of the spatial audio data 106. In the example illustrated in FIG. 2, the first portion 215 is transmitted to the first audio output device 110, and the second portion 217 is transmitted to the second audio output device 140. In the example illustrated in FIG. 3, the first and second portions 215, 217 are combined, interleaved, or otherwise transmitted together to the first audio output device 110. In the example illustrated in FIG. 4, the first and second portions 215, 217 are combined, interleaved, or otherwise transmitted together to both the first audio output device 110 and the second audio output device 140.

Referring to the example illustrated in FIG. 2, the first audio output device 110 includes the receiver 126, the modem 122, the audio codec 120, the memory 114, the transceiver 124, the motion sensor(s) 116, and the processor(s) 112 described with reference to FIG. 1. Additionally, in FIG. 2, the second audio output device 140 includes similar components to the first audio output device 110. For example, in FIG. 2, the second audio output device 140 includes the modem 122, the audio codec 144, the transceiver 148, one or more motion sensors 246, and one or more processors 244 described with reference to FIG. 1, and also includes a receiver 238, a memory 242, one or more motion sensors 246, and one or more processors 244. In the example of FIG. 2, the receiver 238, the memory 242, the motion sensor(s) 246, and the processor(s) 244 are substantially similar to the receiver 126, the memory 114, the motion sensor(s) 116, and the processor(s) 112, respectively, of the first audio output device 140 and operate in the same or substantially similar manner described with reference to FIG. 1.

In FIG. 2, the audio codec 120 includes a stereo decoder 220 configured to decode the first portion 215 of the spatial audio data 106. The audio codec 120 is configured to provide the decoded first portion 215 of the spatial audio data 106 to the transceiver 124 for transmission, with exchange data 250, to the second audio output device 140. The audio codec 120 is also configured to store the decoded first portion 215 of the spatial audio data 106 at a buffer 222 of the memory 114.

In FIG. 2, the audio codec 144 also includes a stereo decoder 240 configured to decode the second portion 217 of the spatial audio data 106. The audio codec 120 is configured to provide the decoded second portion 217 of the spatial audio data 106 to the transceiver 148 for transmission, with the exchange data 250, to the first audio output device 110. The audio codec 120 is also configured to store the decoded second portion 217 of the spatial audio data 106 at a buffer 254 of the memory 242.

The decoded first portion 215 of the spatial audio data 106 stored in the buffer 222 and the buffer 252 includes data frames (e.g., time-windowed segments of audio data) representing two virtual audio sources of a 3D sound field, and the decoded second portion 217 of the spatial audio data 106 stored in the buffer 224 and the buffer 254 includes data frames representing two other virtual audio sources of the 3D sound field. Each of the data frames may include or be associated with synchronization data, such as a frame sequence identifier, a playout time stamp, or other synchronization data. In a particular aspect, the synchronization data is communicated between the audio output devices 110, 140 via the exchange data 250.

In the example of FIG. 2, the processor(s) 112 are configured to execute instructions (e.g., the instructions 132 of FIG. 1) to perform various operations, such as one or more of the operations described with reference to the diagram 160 of FIG. 1. For example, in FIG. 2, the processor(s) 112 includes an aligner 226, a 3D sound converter 228, a sound field rotator 230, a 3D sound converter 232, and a monauralizer 234. Similarly, the processor(s) 244 are configured to execute instructions to perform various operations, such as one or more of the operations described with reference to the diagram 160 of FIG. 1. For example, in FIG. 2, the processor(s) 244 includes an aligner 256, a 3D sound converter 258, a sound field rotator 260, a 3D sound converter 262, and a monauralizer 264.

The aligner 226 is configured to retrieve a data frame of the decoded first portion 215 from the buffer 222 and to combine or align the data frame of the decoded first portion 215 with a corresponding (e.g., time-aligned) data frame of the decoded second portion 217 from the buffer 224. As an example, the aligner 226 may align the data frames based on the synchronization data 138 of FIG. 1. Likewise, the aligner 256 is configured to retrieve a data frame of the decoded first portion 215 from the buffer 252 and to combine or align the data frame of the decoded first portion 215 with a corresponding (e.g., time-aligned) data frame of the decoded second portion 217 from the buffer 254. In each case, a data frame of the decoded first portion 215 and a corresponding data frame of the decoded second portion 217 together constitute one data frame of spatial audio data representing the 3D sound field (e.g., one data frame or time-windowed segment of the ESD representation 164 of FIG. 1).

The 3D sound converter 228 is configured to convert the spatial audio data representing the 3D sound field into a computationally efficient format to perform the sound field rotation operations. For example, the 3D sound converter 228 may perform the ESD to ambisonics conversion as described with reference to block 176 of FIG. 1. In this example, the 3D sound converter 228 converts a data frame of an ESD representation of the spatial audio data to corresponding ambisonics coefficients. The 3D sound converter 258 is configured to perform a similar conversion of the spatial audio data, such as by generating ambisonics coefficients based on a data frame of an ESD representation of the spatial audio data.

The sound field rotator 230 is configured to modify the 3D sound field based on motion data (e.g., the motion data 178) from the motion sensor(s) 116. For example, the sound field rotator 230 may perform the rotation operation 180 by determining a transformation matrix based on the motion data and applying the transformation matrix to the ambisonics coefficients to generate a rotated 3D sound field. Similarly, the sound field rotator 260 is configured to modify the 3D sound field based on motion data (e.g., the motion data 178) from the motion sensor(s) 246 to generate a rotated 3D sound field.

The 3D sound converter 232 is configured to convert the rotated 3D sound field into a computationally efficient format to perform monauralization operations. For example, the 3D sound converter 232 may perform the ambisonics to ESD conversion as described with reference to block 182 of FIG. 1. In this example, the 3D sound converter 228 converts a data frame corresponding rotated ambisonics coefficients to an ESD representation. The 3D sound converter 262 is configured to perform a similar conversion of the spatial audio data, such as by generating an ESD representation based on rotated ambisonics coefficients.

The monauralizer 234 is configured to generate the first monaural audio data 152 by applying a head-related transfer (HRT) function 236 to the rotated 3D sound field to generate audio data for a single ear of the user (e.g., monaural audio data) that simulates how that ear would receive sound in the 3D sound field. The monauralizer 264 is configured to generate the second monaural audio data 154 by applying an HRT function 266 to the rotated 3D sound field to generate audio data for the other ear of the user that simulates how the other ear would receive sound in the 3D sound field.

In a particular aspect, the system 100 of FIG. 2 facilitates generation of head-tracked immersive audio (e.g., the first and second monaural audio output 152, 154) by using a simplified 3D sound field communication scheme (e.g., the ESD representation 164) to reduce the number of convolution operations performed onboard the first and second audio output devices 110, 140, by exchanging data between first and second audio output devices 110, 140 to reduce the number of stereo decoding operations performed to generate the first and second monaural audio output 152, 154, by generating monaural audio output (e.g., the first and second monaural audio output 152, 154), or by a combination thereof. In a particular aspect, the system 100 facilitates balancing of resource demands between a pair of audio output devices (e.g., the first and second audio output devices 110, 140) to extend the duration of 3D sound field reproduction that can be provided by the audio output devices.

Referring to the example illustrated in FIG. 3, the first audio output device 110 includes the receiver 126, the modem 122, the audio codec 120, the memory 114, the transceiver 124, the motion sensor(s) 116, and the processor(s) 112 described with reference to FIGS. 1 and 2. Additionally, in FIG. 3, the second audio output device 140 includes the transceiver 148, the memory 242, the motion sensor(s) 246, and the processor(s) 244 described with reference to FIGS. 1 and 2.

In FIG. 3, the audio codec 120 includes a stereo decoder 220 configured to decode the first portion 215 of the spatial audio data 106 and a stereo decoder 320 configured to decode the second portion 217 of the spatial audio data 106. The audio codec 120 is configured to provide the decoded spatial audio data 106 (e.g., both the first portion 215 and the second portion 217) to the transceiver 124 for transmission, with exchange data 350, to the second audio output device 140. The audio codec 120 is also configured to store the decoded spatial audio data 106 at a buffer 322 of the memory 114. In FIG. 3, the transceiver 148 of the second audio output device is configured to store the decoded spatial audio data received via the exchange data 350 at a buffer 352 of the memory 242.

The decoded spatial audio data 106 stored in the buffers 322 and 352 includes data frames (e.g., time-windowed segments of audio data) representing four virtual audio sources of a 3D sound field or representing ambisonics coefficients. Each of the data frames may include or be associated with synchronization data, such as a frame sequence identifier, a playout time stamp, or other synchronization data. In a particular aspect, the synchronization data is communicated between the audio output devices 110, 140 via the exchange data 350.

In the example of FIG. 3, the processor(s) 112 and the processor(s) 244 are configured to execute instructions (e.g., the instructions 132 of FIG. 1) to perform various operations, such as one or more of the operations described with reference to the diagram 160 of FIG. 1. For example, in FIG. 3, the processor(s) 112 includes the aligner 226, the 3D sound converter 228, the sound field rotator 230, the 3D sound converter 232, and the monauralizer 234 described with reference to FIG. 2. Similarly, the processor(s) 244 include the aligner 256, the 3D sound converter 258, the sound field rotator 260, the 3D sound converter 262, and the monauralizer 264 described with reference to FIG. 2.

In a particular aspect, the system 100 of FIG. 3 facilitates generation of head-tracked immersive audio (e.g., the first and second monaural audio output 152, 154) by using a simplified 3D sound field communication scheme (e.g., the ESD representation 164) to reduce the number of convolution operations performed onboard the first and second audio output devices 110, 140, by exchanging data between first and second audio output devices 110, 140 to reduce the number of stereo decoding operations performed to generate the first and second monaural audio output 152, 154, by generating monaural audio output (e.g., the first and second monaural audio output 152, 154), or by a combination thereof.

Referring to the example illustrated in FIG. 4, the first audio output device 110 includes the receiver 126, the modem 122, the audio codec 120, the memory 114, the transceiver 124, the motion sensor(s) 116, and the processor(s) 112 described with reference to FIGS. 1 and 2. Additionally, in FIG. 4, the second audio output device 140 includes the receiver 238, the modem 146, the audio codec 144, the memory 242, the transceiver 148, the motion sensor(s) 246, and the processor(s) 244 described with reference to FIGS. 1 and 2.

In FIG. 4, the audio codec 120 includes the stereo decoder 220 configured to decode the first portion 215 of the spatial audio data 106 and the stereo decoder 320 configured to decode the second portion 217 of the spatial audio data 106. The audio codec 120 is configured to store the decoded spatial audio data 106 at the buffer 322 of the memory 114. Additionally, the audio codec 144 includes a stereo decoder 440 configured to decode the first portion 215 of the spatial audio data 106 and the stereo decoder 240 configured to decode the second portion 217 of the spatial audio data 106. The audio codec 144 is configured to store the decoded spatial audio data 106 at the buffer 352 of the memory 242.

In FIG. 4, the transceivers 124 and 148 exchange exchange data 450, which includes synchronization data to facilitate synchronization of the first monaural audio output data 152 and the second monaural audio output data 154. For example, one or both of the aligners 226, 256 may initiate transmission of synchronization data when a data frame is read from a respective the buffer 322, 352. As another example, the processor(s) 112, the processor(s) 244, or another component of either of the audio output devices 110, 140 may generate a synchronization signal (e.g., a clock signal) that is conveyed via the exchange data 450.

In the example of FIG. 4, the processor(s) 112 and the processor(s) 244 are configured to execute instructions (e.g., the instructions 132 of FIG. 1) to perform various operations, such as one or more of the operations described with reference to the diagram 160 of FIG. 1. For example, in FIG. 4, the processor(s) 112 includes the aligner 226, the 3D sound converter 228, the sound field rotator 230, the 3D sound converter 232, and the monauralizer 234 described with reference to FIG. 2. Similarly, the processor(s) 244 include the aligner 256, the 3D sound converter 258, the sound field rotator 260, the 3D sound converter 262, and the monauralizer 264 described with reference to FIG. 2.

In a particular aspect, the system 100 facilitates generation of head-tracked immersive audio (e.g., the first and second monaural audio output 152, 154) by using a simplified 3D sound field communication scheme (e.g., the ESD representation 164) to reduce the number of convolution operations performed onboard the first and second audio output devices 110, 140, by exchanging data between first and second audio output devices 110, 140 to reduce the number of stereo decoding operations performed to generate the first and second monaural audio output 152, 154, by generating monaural audio output (e.g., the first and second monaural audio output 152, 154), or by a combination thereof. In a particular aspect, the system 100 facilitates balancing of resource demands between a pair of audio output devices (e.g., the first and second audio output devices 110, 140) to extend the duration of 3D sound field reproduction that can be provided by the audio output devices.

FIG. 5 is a diagram of a headset 500 (e.g., a particular example of a personal audio device), such as headphones, operable to perform data exchange to enable generation of monaural audio output from spatial audio data, in accordance with some examples of the present disclosure. In FIG. 5, a first ear cup of the headset 500 includes the first audio output device 110, and a second ear cup of the headset 500 includes the second audio output device 140. The headset 500 may also include one or more microphones 502. In a particular example, the audio output devices 110, 140 operate as described with reference to any of FIGS. 1-4. For example, the first audio output device 110, the second audio output device 140, or both, of FIG. 5 are configured to obtain spatial audio data; perform data exchange of exchange data based on the spatial audio data with the other audio output device; and generate monaural audio output based on the spatial audio data.

FIG. 6 is a diagram of ear buds 600 (e.g., another particular example of a personal audio device) operable to perform data exchange to enable generation of monaural audio output from spatial audio data, in accordance with some examples of the present disclosure. In FIG. 6, a first ear bud 602 includes or corresponds to the first audio output device 110, and a second ear bud 604 includes or corresponds to the second audio output device 140. One or both of the ear buds 600 may also include one or more microphones. In a particular example, the audio output devices 110, 140 operate as described with reference to any of FIGS. 1-4. For example, the first audio output device 110, the second audio output device 140, or both, of FIG. 6 are configured to obtain spatial audio data; perform data exchange of exchange data based on the spatial audio data with the other audio output device; and generate monaural audio output based on the spatial audio data.

FIG. 7 is a diagram of a headset 700 (e.g., another particular example of a personal audio device), such as a virtual reality headset, an augmented reality headset, or mixed reality headset, operable to perform data exchange to enable generation of monaural audio output from spatial audio data, in accordance with some examples of the present disclosure. In FIG. 7, the first audio output device 110 is included in or coupled to the headset 700 at a location proximate a first ear of a user, and the second audio output device 140 is included in or coupled to the headset 700 at a location proximate a second ear of the user. The headset 700 may also include one or more microphones 710 and one or more display devices 712. In a particular example, the audio output devices 110, 140 operate as described with reference to any of FIGS. 1-4. For example, the first audio output device 110, the second audio output device 140, or both, of FIG. 7 are configured to obtain spatial audio data; perform data exchange of exchange data based on the spatial audio data with the other audio output device; and generate monaural audio output based on the spatial audio data.

Figure 8:
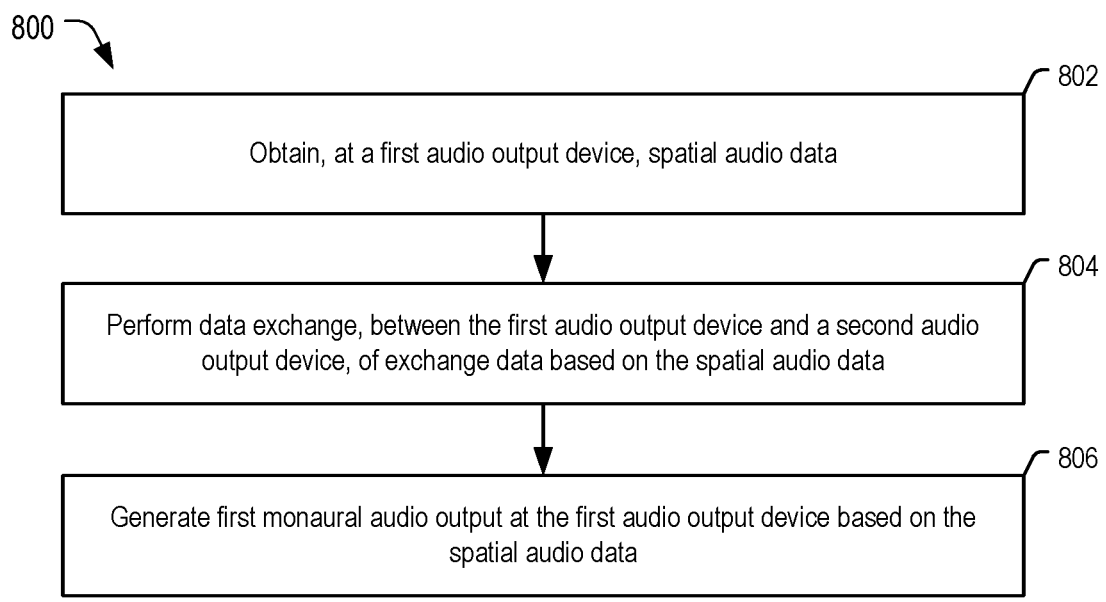
FIG. 8 is a diagram of a particular illustrative implementation of a method of generating monaural audio output from spatial audio data performed by one or more of the audio output devices of FIG. 1, in accordance with some examples of the present disclosure.

FIG. 8 is a diagram of a particular implementation of a method 800 of generating monaural audio output from spatial audio data performed by one or more of audio output devices of FIG. 1-7, in accordance with some examples of the present disclosure. In a particular aspect, one or more operations of the method 800 are performed by at least one of the first audio output device 110, the processor(s) 112, the receiver 126, the transceiver 124, the audio transducer(s) 118, the second audio output device 140, the transceiver 148, the audio transducer(s) 142 of FIGS. 1-4, or a combination of one or more components thereof. In another particular aspect, one or more operations of the method 800 are performed by at least one of the receiver 238, or the processor(s) 244 of FIG. 2-4, or a combination of one or more components thereof.

The method 800 includes, at block 802, obtaining, at a first audio output device, spatial audio data. For example, the first audio output device 110 of FIGS. 1-7 may obtain the spatial audio data 106 via the wireless transmissions 104 from the host device 102 or from the memory 114.

The method 800 includes, at block 804, performing data exchange, between the first audio output device and a second audio output device, of exchange data based on the spatial audio data. For example, the first and second audio output devices 110, 140 of FIGS. 1-7 may exchange data via wireless transmissions, such as via a wireless peer-to-peer ad hoc link between the audio output devices 110, 140.

The method 800 includes, at block 806, generating first monaural audio output at the first audio output device based on the spatial audio data. For example, the first audio output device 110 of FIGS. 1-7 may generate, based on the spatial audio data the first monaural audio output 152 for a first ear of a user.

The method 800 of FIG. 8 may be implemented by a field-programmable gate array (FPGA) device, an application-specific integrated circuit (ASIC), a processing unit such as a central processing unit (CPU), a DSP, a controller, another hardware device, firmware device, or any combination thereof. As an example, the method 800 of FIG. 8 may be performed by a processor that executes instructions, such as described with reference to FIG. 1.

Although the method 800 of FIG. 8 is described generally from the perspective of the first audio output device 110, the second audio output device 140 may perform the operations of the method 800 in addition to, or instead of, the first audio output device 110.

In a particular aspect, the method 800 enables generation of monaural audio output based on spatial audio data, such as head-tracked immersive audio (e.g., the first and second monaural audio output 152, 154 of FIGS. 1-4). In a particular aspect, the method 800 enables using a simplified 3D sound field communication scheme (e.g., the ESD representation 164) to reduce the number of convolution operations performed onboard an audio output device (e.g., the first and second audio output devices 110, 140), exchanging data between audio output devices (e.g., the first and second audio output devices 110, 140) to reduce the number of stereo decoding operations performed to generate the monaural audio output at each of the audio output devices (e.g., the first and second monaural audio output 152, 154), generating monaural audio output (e.g., the first and second monaural audio output 152, 154), or a combination thereof. In a particular aspect, the method 800 is performed in a manner that balances the resource demands between a pair of audio output devices (e.g., the first and second audio output devices 110, 140) to extend the duration of 3D sound field reproduction that can be provided by the audio output devices.

Figure 9:
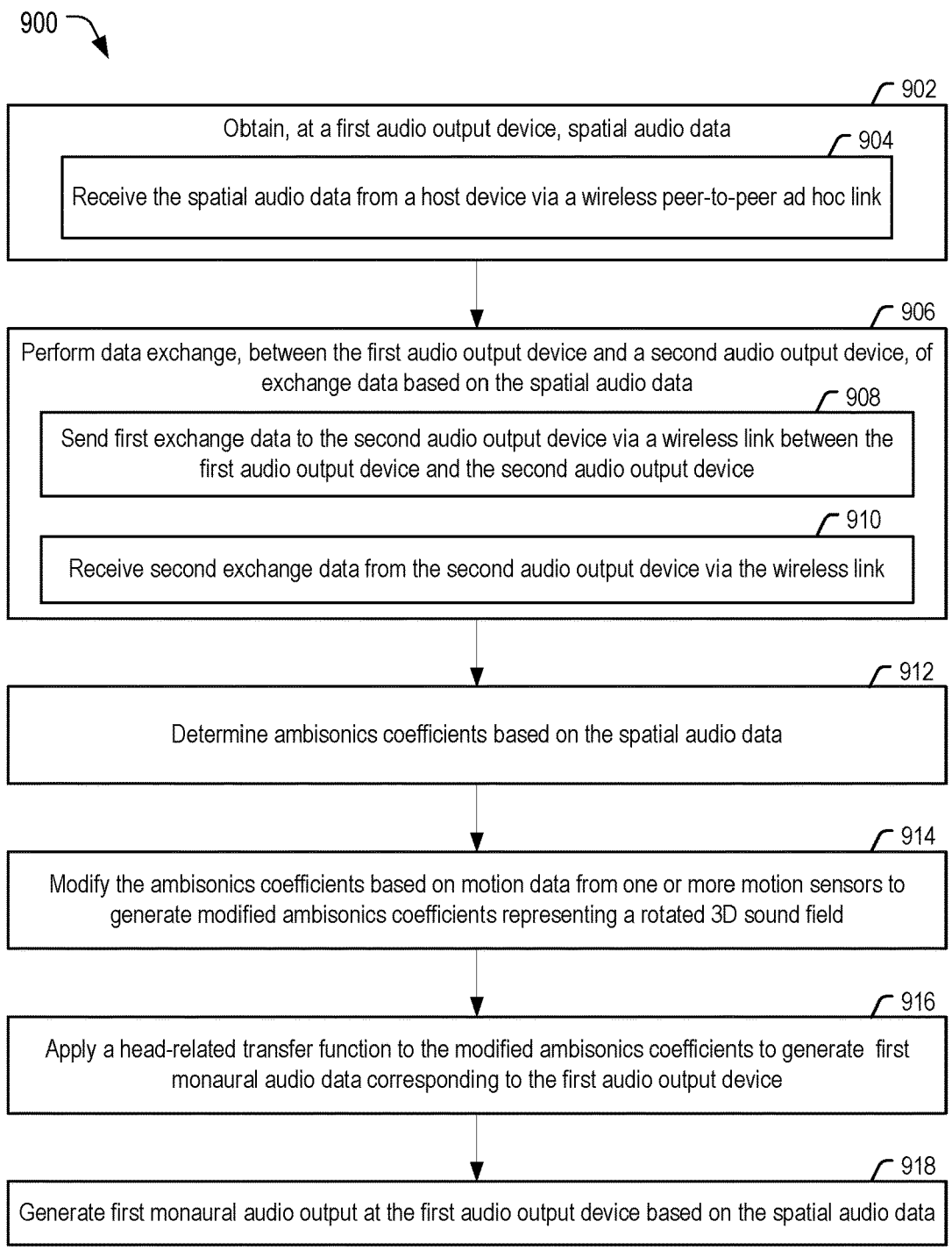
FIG. 9 is a diagram of another particular illustrative implementation of a method of generating monaural audio output from spatial audio data performed by one or more of the audio output devices of FIG. 1, in accordance with some examples of the present disclosure.

FIG. 9 is a diagram of another particular implementation of a method 900 of generating monaural audio output from spatial audio data performed by one or more of the audio output devices of FIG. 1-7, in accordance with some examples of the present disclosure. In a particular aspect, one or more operations of the method 900 are performed by at least one of the first audio output device 110, the processor(s) 112, the receiver 126, the transceiver 124, the audio transducer(s) 118, the second audio output device 140, the transceiver 148, the audio transducer(s) 142 of FIGS. 1-4, or a combination of one or more components thereof. In another particular aspect, one or more operations of the method 800 are performed by at least one of the receiver 238, or the processor(s) 244 of FIG. 2-4, or a combination thereof.

The method 900 includes, at block 902, obtaining, at a first audio output device, spatial audio data. In a particular aspect, obtaining the spatial audio data in the method 900 includes, at block 904, receiving the spatial audio data from a host device via a wireless peer-to-peer ad hoc link. For example, the first audio output device 110 of FIGS. 1-7 may obtain the spatial audio data 106 via the wireless transmissions 104 from the host device 102.

The method 900 includes, at block 906, performing data exchange, between the first audio output device and a second audio output device, of exchange data based on the spatial audio data. In the particular example, illustrated in FIG. 9, performing data exchange of exchange data includes, at block 908, sending first exchange data to the second audio output device, and at block 910, receiving second exchange data from the second audio output device. In various implementations, the exchange data includes, as illustrative examples, audio waveform data, ambisonics coefficients, decoded stereo data, and/or an ESD representation.

The method 900 includes, at block 912, determining ambisonics coefficients based on the spatial audio data. For example, the 3D sound converter 228 may perform operations (e.g., the ESD to ambisonics operations at block 176) to determine the ambisonics coefficients based on an ESD representation of the spatial audio data. In some implementations, a 3D sound field representation representing the spatial audio data is generated based in part on the exchange data.

The method 900 includes, at block 914, modifying the ambisonics coefficients based on motion data from one or more motion sensors to generate modified ambisonics coefficients representing a rotated 3D sound field. For example, the sound field rotator 230 may perform operations (e.g., the rotation operations 180 based on the motion data 178) to determine the rotated 3D sound field.

The method 900 includes, at block 916, applying a head-related transfer function to the modified ambisonics coefficients to generate first monaural audio data corresponding to the first audio output device. For example, the monauralizer 234 may apply the HRT function 236 to the ambisonics coefficients to generate the monaural audio data 152.

The method 900 includes, at block 918, generating first monaural audio output at the first audio output device based on the spatial audio data. For example, the audio transducer(s) 118 may generate the first monaural audio output 152.

Although the method 900 of FIG. 9 is described generally from the perspective of the first audio output device 110, the second audio output device 140 may perform the operations of the method 900 in addition to, or instead of, the first audio output device 110.

In a particular aspect, the method 900 enables generation of monaural audio output based on spatial audio data, such as head-tracked immersive audio (e.g., the first and second monaural audio output 152, 154 of FIGS. 1-4). In a particular aspect, the method 800 enables using a simplified 3D sound field communication scheme (e.g., the ESD representation 164) to reduce the number of convolution operations performed onboard an audio output device (e.g., the first and second audio output devices 110, 140), exchanging data between audio output devices (e.g., the first and second audio output devices 110, 140) to reduce the number of stereo decoding operations performed to generate the monaural audio output at each of the audio output devices (e.g., the first and second monaural audio output 152, 154), generating monaural audio output (e.g., the first and second monaural audio output 152, 154), or a combination thereof. In a particular aspect, the method 900 is performed in a manner that balances the resource demands between a pair of audio output devices (e.g., the first and second audio output devices 110, 140) to extend the duration of 3D sound field reproduction that can be provided by the audio output devices.

In conjunction with the described implementations, an apparatus includes means for obtaining spatial audio data at a first audio output device. For example, the means for obtaining the spatial audio data can correspond to the first audio output device 110, the processor(s) 112, the receiver 126, one or more other circuits or components configured to obtain spatial audio data, or any combination thereof.

The apparatus also includes means for performing data exchange of exchange data based on the spatial audio data. For example, the means for performing data exchange can correspond to the first audio output device 110, the processor(s) 112, the transceiver 124, one or more other circuits or components configured to perform data exchange, or any combination thereof.

The apparatus further includes means for generating first monaural audio output at the first audio output device based on the spatial audio data. For example, the means for generating first monaural audio output can correspond to the first audio output device 110, the processor(s) 112, the audio transducer 118, one or more other circuits or components configured to generate monaural audio output, or any combination thereof.

In some implementations, a non-transitory computer-readable medium (e.g., a computer-readable storage device, such as the memory 114) includes instructions (e.g., the instructions 132) that, when executed by one or more processors (e.g., the processor(s) 112), cause the one or more processors to obtain spatial audio data (e.g., the spatial audio data 106) at a first audio output device (e.g., the first audio output device 110). The instructions, when executed by the one or more processors, also cause the one or more processors to perform data exchange of exchange data (e.g., the first exchange data 136, the second exchange data 150, the synchronization data 138, or a combination thereof) based on the spatial audio data. The instructions, when executed by the one or more processors, also cause the one or more processors to generate first monaural audio output (e.g., the first monaural audio output 152) at the first audio output device based on the spatial audio data.

Particular aspects of the disclosure are described below in a first set of interrelated clauses:

According to Clause 1, a device includes: a memory configure to store instructions and one or more processors configured to execute the instructions to: obtain spatial audio data at a first audio output device; perform data exchange, between the first audio output device and a second audio output device, of exchange data based on the spatial audio data; and generate first monaural audio output at the first audio output device based on the spatial audio data.

Clause 2 includes the device of Clause 1 and further includes a receiver coupled to the one or more processors and configured to receive the spatial audio data from a host device via a wireless peer-to-peer ad hoc link.

Clause 3 includes the device of Clause 1 or Clause 2 and further includes a transceiver coupled to the one or more processors, the transceiver configured to send first exchange data to the second audio output device via a wireless link between the first audio output device and the second audio output device.

Clause 4 includes the device of Clause 3 wherein the transceiver is further configured to receive second exchange data from the second audio output device via the wireless link.

Clause 5 includes the device of any of Clauses 1 to 4 and further includes a transceiver coupled to the one or more processors, the transceiver configured to send first exchange data to the second audio output device and to receive second exchange data from the second audio output device, wherein generating the first monaural audio output includes determining a 3D sound field representation based on the spatial audio data and the second exchange data.

Clause 6 includes the device of any of Clauses 1 to 5 and further includes: a modem coupled to the one or more processors and configured to obtain spatial audio data via a wireless transmission; and an audio codec coupled to the modem and coupled to the one or more processors, wherein the audio codec is configured to generate audio waveform data based on the spatial audio data.

Clause 7 includes the device of Clause 6 wherein the exchange data includes the audio waveform data.

Clause 8 includes the device of Clause 6 wherein the audio waveform data includes pulse-code modulation (PCM) data.

Clause 9 includes the device of any of Clauses 1 to 8 wherein the exchange data includes synchronization data to facilitate synchronization of the first monaural audio output with second monaural audio output at the second audio output device.

Clause 10 includes the device of any of Clauses 1 to 9 wherein the exchange data includes ambisonics coefficients.

Clause 11 includes the device of any of Clauses 1 to 10 wherein the first audio output device corresponds to a first earbud, a first speaker, or a first earcup of a headset, and wherein the second audio output device corresponds to a second earbud, a second speaker, or a second earcup of the headset.

Clause 12 includes the device of any of Clauses 1 to 11 wherein the spatial audio data includes ambisonics coefficients representing a 3D sound field.

Clause 13 includes the device of any of Clauses 1 to 12 wherein the spatial audio data includes first audio data corresponding to a first plurality of sound sources of a 3D sound field and second audio data corresponding to a second plurality of sound sources of the 3D sound field, wherein the first plurality of sound sources is distinct from the second plurality of sound sources.

Clause 14 includes the device of any of Clauses 1 to 13 wherein the spatial audio data includes first audio data corresponding to a first plurality of sound sources of a 3D sound field and wherein performing the data exchange includes receiving second audio data from the second audio output device, wherein the second audio data corresponds to a second plurality of sound sources of the 3D sound field, wherein the first plurality of sound sources is distinct from the second plurality of sound sources.

Clause 15 includes the device of any of Clauses 1 to 14 and further includes one or more motion sensors coupled to the one or more processors, wherein the one or more processors are further configured to: determine ambisonics coefficients based on the spatial audio data; modify the ambisonics coefficients based on motion data from the one or more motion sensors to generate modified ambisonics coefficients representing a rotated 3D sound field; and apply a head-related transfer function to the modified ambisonics coefficients to generate first audio data corresponding to the first monaural audio output.

Clause 16 includes the device of Clause 15 wherein the exchange data includes data representing the rotated 3D sound field.

Clause 17 includes the device of Clause 15 wherein the ambisonics coefficients are determined further based on second exchange data received from the second audio output device.

Clause 18 includes the device of any of Clauses 1 to 17 and further includes a memory coupled to the one or more processors, wherein the spatial audio data is obtained from the memory.

According to Clause 19 a method includes: obtaining, at a first audio output device, spatial audio data; performing data exchange, between the first audio output device and a second audio output device, of exchange data based on the spatial audio data; and generating first monaural audio output at the first audio output device based on the spatial audio data.

Clause 20 includes the method of Clause 19 and further includes receiving the spatial audio data from a host device via a wireless peer-to-peer ad hoc link.

Clause 21 includes the method of Clause 19 or Clause 20 wherein performing data exchange includes sending first exchange data to the second audio output device via a wireless link between the first audio output device and the second audio output device.

Clause 22 includes the method of Clause 21 wherein performing data exchange includes receiving second exchange data from the second audio output device via the wireless link.

Clause 23 includes the method of any of Clauses 19 to 22 wherein performing data exchange includes sending first exchange data to the second audio output device and receiving second exchange data from the second audio output device, wherein generating the first monaural audio output includes determining a 3D sound field representation based on the spatial audio data and the second exchange data.

Clause 24 includes the method of any of Clauses 19 to 23 and further includes generating audio waveform data based on the spatial audio data.

Clause 25 includes the method of Clause 24 wherein the exchange data includes the audio waveform data.

Clause 26 includes the method of Clause 24 wherein the audio waveform data includes pulse-code modulation (PCM) data.

Clause 27 includes the method of any of Clauses 19 to 26 wherein the exchange data includes synchronization data to facilitate synchronization of the first monaural audio output with second monaural audio output at the second audio output device.

Clause 28 includes the method of any of Clauses 19 to 27 wherein the exchange data includes ambisonics coefficients.

Clause 29 includes the method of any of Clauses 19 to 28 wherein the first audio output device corresponds to a first earbud, a first speaker, or a first earcup of a headset, and wherein the second audio output device corresponds to a second earbud, a second speaker, or a second earcup of the headset.

Clause 30 includes the method of any of Clauses 19 to 29 wherein the spatial audio data includes ambisonics coefficients representing a 3D sound field.

Clause 31 includes the method any of Clauses 19 to 30 wherein the spatial audio data includes first audio data corresponding to a first plurality of sound sources of a 3D sound field and second audio data corresponding to a second plurality of sound sources of the 3D sound field, wherein the first plurality of sound sources is distinct from the second plurality of sound sources.

Clause 32 includes the method of any of Clauses 19 to 31 wherein the spatial audio data includes first audio data corresponding to a first plurality of sound sources of a 3D sound field and wherein performing the data exchange includes receiving second audio data from the second audio output device, wherein the second audio data corresponds to a second plurality of sound sources of the 3D sound field, wherein the first plurality of sound sources is distinct from the second plurality of sound sources.

Clause 33 includes the method of any of Clauses 19 to 32 and further includes: determining ambisonics coefficients based on the spatial audio data; modifying the ambisonics coefficients based on motion data from one or more motion sensors to generate modified ambisonics coefficients representing a rotated 3D sound field; and applying a head-related transfer function to the modified ambisonics coefficients to generate first monaural audio data corresponding to the first audio output device.

Clause 34 includes the method of Clause 33 wherein the exchange data includes data representing the rotated 3D sound field.

Clause 35 includes the method of Clause 33 wherein the ambisonics coefficients are determined further based on second exchange data received from the second audio output device.

Clause 36 includes the method any of Clauses 19 to 35 wherein the spatial audio data is obtained from a memory.

According to Clause 37 an apparatus includes: means for obtaining obtain spatial audio data at a first audio output device; means for performing data exchange, between the first audio output device and a second audio output device, of exchange data based on the spatial audio data; and means for generating first monaural audio output at the first audio output device based on the spatial audio data.

Clause 38 includes the apparatus of Clause 37 wherein the means for performing data exchange includes means for receiving the spatial audio data from a host device via a wireless peer-to-peer ad hoc link.

Clause 39 includes the apparatus of Clause 37 or Clause 38 wherein the means for performing data exchange includes means for sending first exchange data to the second audio output device via a wireless link between the first audio output device and the second audio output device.

Clause 40 includes the apparatus of Clause 39 wherein the means for performing data exchange further includes means for receiving second exchange data from the second audio output device via the wireless link.

Clause 41 includes the apparatus of any of Clauses 37 to 40 wherein the means for performing data exchange includes means for sending first exchange data to the second audio output device and means for receiving second exchange data from the second audio output device, wherein generating the first monaural audio output includes determining a 3D sound field representation based on the spatial audio data and the second exchange data.

Clause 42 includes the apparatus of any of Clauses 37 to 41 and further includes means for generating audio waveform data based on the spatial audio data.

Clause 43 includes the apparatus of any of Clauses 37 to 42 wherein the exchange data includes synchronization data to facilitate synchronization of the first monaural audio output with second monaural audio output at the second audio output device.

Clause 44 includes the apparatus of any of Clauses 37 to 43 wherein the means for obtaining spatial audio data, the means for performing data exchange, and the means for generating first monaural audio output are integrated within a first earbud, a first speaker, or a first earcup of a headset, and wherein the second audio output device corresponds to a second earbud, a second speaker, or a second earcup of the headset.

Clause 45 includes the apparatus of any of Clauses 37 to 44 wherein the spatial audio data includes first audio data corresponding to a first plurality of sound sources of a 3D sound field and second audio data corresponding to a second plurality of sound sources of the 3D sound field, wherein the first plurality of sound sources is distinct from the second plurality of sound sources.

Clause 46 includes the apparatus of any of Clauses 37 to 45 wherein the spatial audio data includes first audio data corresponding to a first plurality of sound sources of a 3D sound field and wherein the means for performing the data exchange includes means for receiving second audio data from the second audio output device, wherein the second audio data corresponds to a second plurality of sound sources of the 3D sound field, wherein the first plurality of sound sources is distinct from the second plurality of sound sources.

Clause 47 includes the apparatus of any of Clauses 37 to 46 and further includes means for storing the spatial audio data.

According to Clause 48 a non-transitory computer-readable storage device stores instructions that are executable by one or more processors to cause the processors to: obtain spatial audio data at a first audio output device; perform data exchange, between the first audio output device and a second audio output device, of exchange data based on the spatial audio data; and generate first monaural audio output at the first audio output device based on the spatial audio data.

Clause 49 includes the non-transitory computer-readable storage device of Clause 48 wherein the instructions further cause the one or more processors to send first exchange data to the second audio output device and to receive second exchange data from the second audio output device, wherein generating the first monaural audio output includes determining a 3D sound field representation based on the spatial audio data and the second exchange data.

Clause 50 includes the non-transitory computer-readable storage device of Clause 48 or Clause 49 wherein the instructions further cause the one or more processors to generate audio waveform data based on the spatial audio data.

Clause 51 includes the non-transitory computer-readable storage device of any of Clauses 48 to 50 wherein the exchange data includes synchronization data to facilitate synchronization of the first monaural audio output with second monaural audio output at the second audio output device.

Clause 52 includes the non-transitory computer-readable storage device of any of Clauses 48 to 52 wherein the spatial audio data includes first audio data corresponding to a first plurality of sound sources of a 3D sound field and second audio data corresponding to a second plurality of sound sources of the 3D sound field, wherein the first plurality of sound sources is distinct from the second plurality of sound sources.

Clause 53 includes the non-transitory computer-readable storage device of any of Clauses 48 to 53 wherein the instructions further cause the one or more processors to: determine ambisonics coefficients based on the spatial audio data; modify the ambisonics coefficients based on motion data from the one or more motion sensors to generate modified ambisonics coefficients representing a rotated 3D sound field; and apply a head-related transfer function to the modified ambisonics coefficients to generate first monaural audio data corresponding to the first audio output device.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A device comprising:
   a memory configured to store a head-related transfer function; and
   one or more processors configured to:
      obtain, at a first audio output device, spatial audio data representing a three-dimensional (3D) sound field;
      perform data exchange, between the first audio output device and a second audio output device, of exchange data based on the spatial audio data; and
      apply the head-related transfer function to generate first monaural audio output at the first audio output device based on the spatial audio data.

2. The device of claim 1, further comprising a receiver coupled to the one or more processors and configured to receive the spatial audio data from a host device via a wireless peer-to-peer ad hoc link.

3. The device of claim 1, further comprising a transceiver coupled to the one or more processors, the transceiver configured to send first exchange data to the second audio output device via a wireless link between the first audio output device and the second audio output device.

4. The device of claim 3, wherein the transceiver is further configured to receive second exchange data from the second audio output device via the wireless link.

5. The device of claim 1, further comprising a transceiver coupled to the one or more processors, the transceiver configured to send first exchange data to the second audio output device and to receive second exchange data from the second audio output device, wherein generating the first monaural audio output includes determining a 3D sound field representation based on the spatial audio data and the second exchange data.

6. The device of claim 1, further comprising:
   a modem coupled to the one or more processors and configured to obtain the spatial audio data via a wireless transmission; and
   an audio codec coupled to the modem and coupled to the one or more processors, wherein the audio codec is configured to generate audio waveform data based on the spatial audio data.

7. The device of claim 6, wherein the exchange data includes the audio waveform data.

8. The device of claim 6, wherein the audio waveform data includes pulse-code modulation (PCM) data.

9. The device of claim 1, wherein the exchange data includes synchronization data to facilitate synchronization of the first monaural audio output with second monaural audio output at the second audio output device.

10. The device of claim 1, wherein the exchange data includes ambisonics coefficients.

11. The device of claim 1, wherein the first audio output device corresponds to a first ear bud, a first speaker, or a first ear cup of a headset, and wherein the second audio output device corresponds to a second earbud, a second speaker, or a second earcup of the headset.

12. The device of claim 1, wherein the spatial audio data includes ambisonics coefficients.

13. The device of claim 1, wherein the spatial audio data comprises first audio data corresponding to a first plurality of sound sources of the 3D sound field and second audio data corresponding to a second plurality of sound sources of the 3D sound field, and wherein the first plurality of sound sources is distinct from the second plurality of sound sources.

14. The device of claim 1, wherein the spatial audio data comprises first audio data corresponding to a first plurality of sound sources of the 3D sound field, wherein performing the data exchange includes receiving second audio data from the second audio output device, wherein the second audio data corresponds to a second plurality of sound sources of the 3D sound field, and wherein the first plurality of sound sources is distinct from the second plurality of sound sources.

15. The device of claim 1, further comprising one or more motion sensors coupled to the one or more processors, wherein the one or more processors are further configured to:
determine ambisonics coefficients based on the spatial audio data;
modify the ambisonics coefficients based on motion data from the one or more motion sensors to generate modified ambisonics coefficients representing a rotated 3D sound field; and
apply the head-related transfer function to the modified ambisonics coefficients to generate first audio data corresponding to the first monaural audio output.

16. The device of claim 15, wherein the ambisonics coefficients are determined further based on second exchange data received from the second audio output device.

17. The device of claim 1, wherein the spatial audio data is obtained from the memory.

18. A method comprising:
obtaining, at a first audio output device, spatial audio data representing a three-dimensional (3D) sound field;
performing data exchange, between the first audio output device and a second audio output device, of exchange data based on the spatial audio data; and
applying a head-related transfer function to generate first monaural audio output at the first audio output device based on the spatial audio data.

19. The method of claim 18, further comprising receiving the spatial audio data from a host device via a wireless peer-to-peer ad hoc link.

20. The method of claim 18, wherein performing data exchange comprises sending first exchange data to the second audio output device and receiving second exchange data from the second audio output device, and wherein generating the first monaural audio output includes determining a 3D sound field representation based on the spatial audio data and the second exchange data.

21. The method of claim 18, wherein the exchange data includes synchronization data to facilitate synchronization of the first monaural audio output with second monaural audio output at the second audio output device.

22. The method of claim 18, wherein the exchange data includes ambisonics coefficients.

23. The method of claim 18, wherein the spatial audio data comprises first audio data corresponding to a first plurality of sound sources of the 3D sound field, wherein performing the data exchange includes receiving second audio data from the second audio output device, wherein the second audio data corresponds to a second plurality of sound sources of the 3D sound field, and wherein the first plurality of sound sources is distinct from the second plurality of sound sources.

24. The method of claim 18, further comprising:
determining ambisonics coefficients based on the spatial audio data; and
modifying the ambisonics coefficients based on motion data from one or more motion sensors to generate modified ambisonics coefficients representing a rotated 3D sound field; and
a wherein the head-related transfer function is applied to the modified ambisonics coefficients to generate the first monaural audio output.

25. An apparatus comprising:
means for obtaining, at a first audio output device, spatial audio data representing a three-dimensional (3D) sound field;
means for performing data exchange, between the first audio output device and a second audio output device, of exchange data based on the spatial audio data; and
means for applying a head-related transfer function to generate first monaural audio output at the first audio output device based on the spatial audio data.

26. The apparatus of claim 25, wherein the means for performing data exchange comprises means for receiving the spatial audio data from a host device via a wireless peer-to-peer ad hoc link.

27. The apparatus of claim 25, wherein the means for performing data exchange comprises means for sending first exchange data to the second audio output device via a wireless link between the first audio output device and the second audio output device.

28. The apparatus of claim 27, wherein the means for performing data exchange further comprises means for receiving second exchange data from the second audio output device via the wireless link.

29. A non-transitory computer-readable storage device storing instructions that are executable by one or more processors to cause the one or more processors to:
obtain, at a first audio output device, spatial audio data representing a three-dimensional (3D) sound field;
perform data exchange, between the first audio output device and a second audio output device, of exchange data based on the spatial audio data; and
apply a head-related transfer function to generate first monaural audio output at the first audio output device based on the spatial audio data.

30. The non-transitory computer-readable storage device of claim 29, wherein the instructions further cause the one or more processors to send first exchange data to the second audio output device and to receive second exchange data from the second audio output device, wherein generating the first monaural audio output includes determining a 3D sound field representation based on the spatial audio data and the second exchange data.

* * * * *